(12) United States Patent
Beck, Jr.

(10) Patent No.: US 6,349,632 B1
(45) Date of Patent: Feb. 26, 2002

(54) APPARATUS FOR COOKING MEATS

(76) Inventor: John P. Beck, Jr., 19009 W. Lake Ter. Pkwy., Baton Rouge, LA (US) 70817

( * ) Notice: Subject to any disclaimer, the term of this patent is extended or adjusted under 35 U.S.C. 154(b) by 0 days.

(21) Appl. No.: 09/548,411

(22) Filed: Apr. 13, 2000

(51) Int. Cl.[7] .......................... A47J 37/04; A47J 37/10; A47J 37/07
(52) U.S. Cl. .............................. 99/345; 99/419; 99/446; 99/418
(58) Field of Search ..................... 99/345, 418, 419, 99/426, 446; 426/509, 523

(56) References Cited

U.S. PATENT DOCUMENTS

| | | | | |
|---|---|---|---|---|
| 4,272,669 A | * | 6/1981 | Yamanaka et al. | 219/385 |
| 4,450,759 A | * | 5/1984 | Steibel | 99/419 |
| 5,008,508 A | * | 4/1991 | Skerker et al. | 219/10.55 E |
| 5,081,916 A | * | 1/1992 | Kuhling et al. | 99/419 |
| 5,301,602 A | | 4/1994 | Ryczek | 99/345 |
| 5,575,198 A | * | 11/1996 | Lowery | 99/426 |
| 5,893,320 A | * | 4/1999 | Demaree | 99/419 |
| 6,062,131 A | * | 5/2000 | Holland | 99/345 |
| 6,119,585 A | * | 9/2000 | Guidry | 99/345 |
| 6,125,739 A | * | 10/2000 | Jernigan | 99/345 |
| 6,192,792 B1 | * | 2/2001 | Gremillion | 99/426 |

OTHER PUBLICATIONS

Professional Cooking, 3rd Edition; Wayne Gisslen, New York, 1995, pp. 38–39.*

* cited by examiner

*Primary Examiner*—Keith Hendricks
*Assistant Examiner*—Drew Becker
(74) *Attorney, Agent, or Firm*—Jones, Walker, Waechter, Poitevent, Carrere & Denegre, L.L.P.

(57) ABSTRACT

An apparatus and method for cooking meats, such as chicken are disclosed. The apparatus comprises a base having an upstanding member positioned thereon. The upstanding member has a chamber to receive food seasoning. The chamber is adapted to form a seal with the cavity of the chicken to promote seasoning of the meat from within during cooking and to allow the seasoning vapors to enter the meat, thereby promoting a moister cooked product.

14 Claims, 2 Drawing Sheets

APPARATUS FOR COOKING MEATS

BACKGROUND OF THE INVENTION

1. Field of the Invention

This invention relates to apparatuses and utensils used to cook meats, namely an apparatus that will a hold a piece of food upright within a cooking apparatus, such as a barbecue pit.

2. Background

A variety of apparatuses are used to position chickens and game fowl in an upright position for cooking. These apparatuses generally comprise an upstanding member connected to a wide base that is configured to collect any of the drippings that may fall from the fowl during cooking. Because the bases are configured to receive the drippings, they generally do not allow for complete heat and airflow around all sides of the fowl, resulting in increased cooking times and uneven cooking.

Prior cooking methods have also included inserting an open, partially filled beer can into the cavity of the chicken and positioning the beer can over a grill. While this method seems viable, the can is prone to toppling. Additionally, the paint on the sides of the beer cans may vaporize and/or otherwise penetrate into the chicken. What is needed is an apparatus that provides even cooking along the sides of a chicken while eliminating the problems associated with prior art methods.

ADVANTAGES AND OBJECTS OF THE INVENTION

The present invention provides a solution to the problems found in prior methods. The apparatus comprises a support base that prevents the apparatus from toppling when a chicken or other food has been positioned on the apparatus and an upstanding member to hold the food. As explained in more detail below, the configuration of the support base allows heat to efficiently pass along the sides of the chicken without being significantly diverted around the support base as in the prior art, thus resulting in more efficient and even cooking. While processes for casting cookware from iron are well known in the art, the benefits of doing so may not be. The use of cast iron in the construction of the apparatus helps ensure the apparatus has favorable heat retention properties and even heat distribution properties. These properties promote even cooking by minimizing hot spots in the apparatus which can occur when other metals are employed. When cast iron is properly seasoned (such as by coating it with oil or fat product and heated), it produces a non-stick surface. The use of cast iron also accentuates the flavor of the resulting cooked chicken or other food. Additionally, cast iron imparts a significant amount of beneficial dietary iron to a user's food. Clearly the use of cast iron is not merely a design choice among equivalent materials, but rather provides the apparatus with important functional differences not found in non-iron cookware.

The configuration of the upstanding member helps form a seal with the internal cavity of the chicken forcing the seasoning to pass into the chicken from the cavity, thereby enhancing the flavor of the meat. When liquid seasoning is used (as discussed below), the configuration of the upstanding member promotes a moister finished product.

With the aforementioned considerations in mind, it is therefore an object of this invention to provide an apparatus for cooking meats that promotes even cooking through the entirety of the meat.

It is a further object of the present invention to provide a method of efficiently and effectively cooking a piece of meat while providing enhanced seasoning and moisture content during the cooking process.

These and other advantages and objects of this invention shall become apparent from the ensuing description of the invention.

SUMMARY OF THE INVENTION

The present invention comprises a method and apparatus for cooking meats. The cooking apparatus comprises a base positionable adjacent to a heat source and configured to support an upstanding member. The base is configured to allow air currents to flow substantially along the upstanding member during cooking. The cooking apparatus further comprises an upstanding member positioned on the base and configured to form a chamber therein. A food seasoning may be positioned within the chamber before a piece of food is positioned on the upstanding member.

The method for cooking food, using a cooking apparatus, comprises the steps of (a) positioning a food seasoning within the chamber of the cooking apparatus; (b) positioning a piece of food on the upstanding member; (c) positioning the apparatus near a source of heat; and, (d) providing heat to cook the food. The food preferably has a cavity therein so that the chamber and the cavity form a substantial seal therebetween.

DETAILED DESCRIPTION OF PREFERRED EMBODIMENTS OF THE INVENTION

Illustrations of construction, design, and methods of operation of the invention are set forth below with specific references to the Figures. However, the inventor does not intend to limit the scope of the invention to these embodiments.

Figure 1:
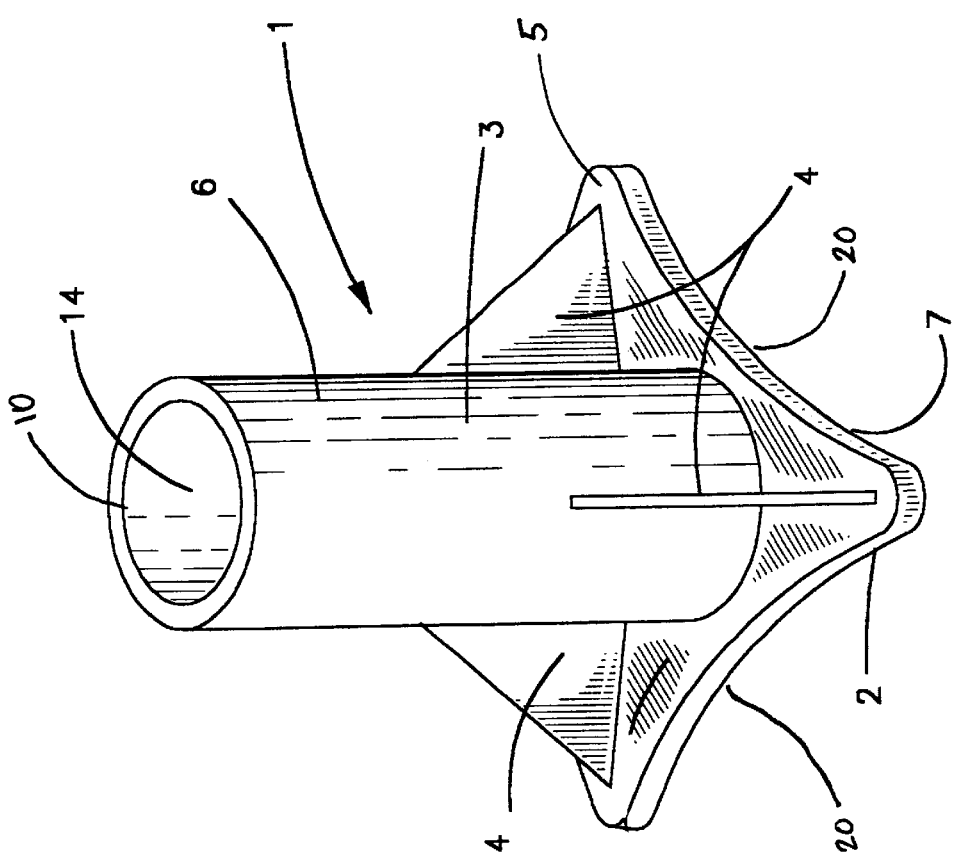
FIG. 1 illustrates a perspective view of an embodiment of the invention.

Viewing FIG. 1, cooking apparatus 1 comprises a base 2, an upstanding member 3, and may include one or more support members 4 extending between base 2 and upstanding member 3.

Base 2 comprises a plurality of feet 5 configured to allow support members 4 to engage base 2. Base 2 is preferably configured to allow maximum heat flow upward along the sides 6 of upstanding member 3 so that all sides of a piece of food being cooked are efficiently and evenly heated. In the embodiment of FIG. 1, the base is thus configured by providing recesses 20 between feet 5. It will be seen that radiant heat and hot air may more closely flow along the sides of upstanding member 3 at recesses 20.

Base 2 may take a variety of shapes but should be configured so that apparatus 1 may be conveniently positioned within a cooking apparatus, such as a barbecue pit (not shown), that provides a source of heat. While a barbecue pit is not shown, FIG. 2 does illustrate a surface, such as grill 100, upon which apparatus 1 may be positioned. Base 2 is preferably positionable on the grill 100 of a barbecue pit, and preferably has flat bottom 7. Base 2 supports upstanding member 3 which is in a substantially upright position.

Figure 2:
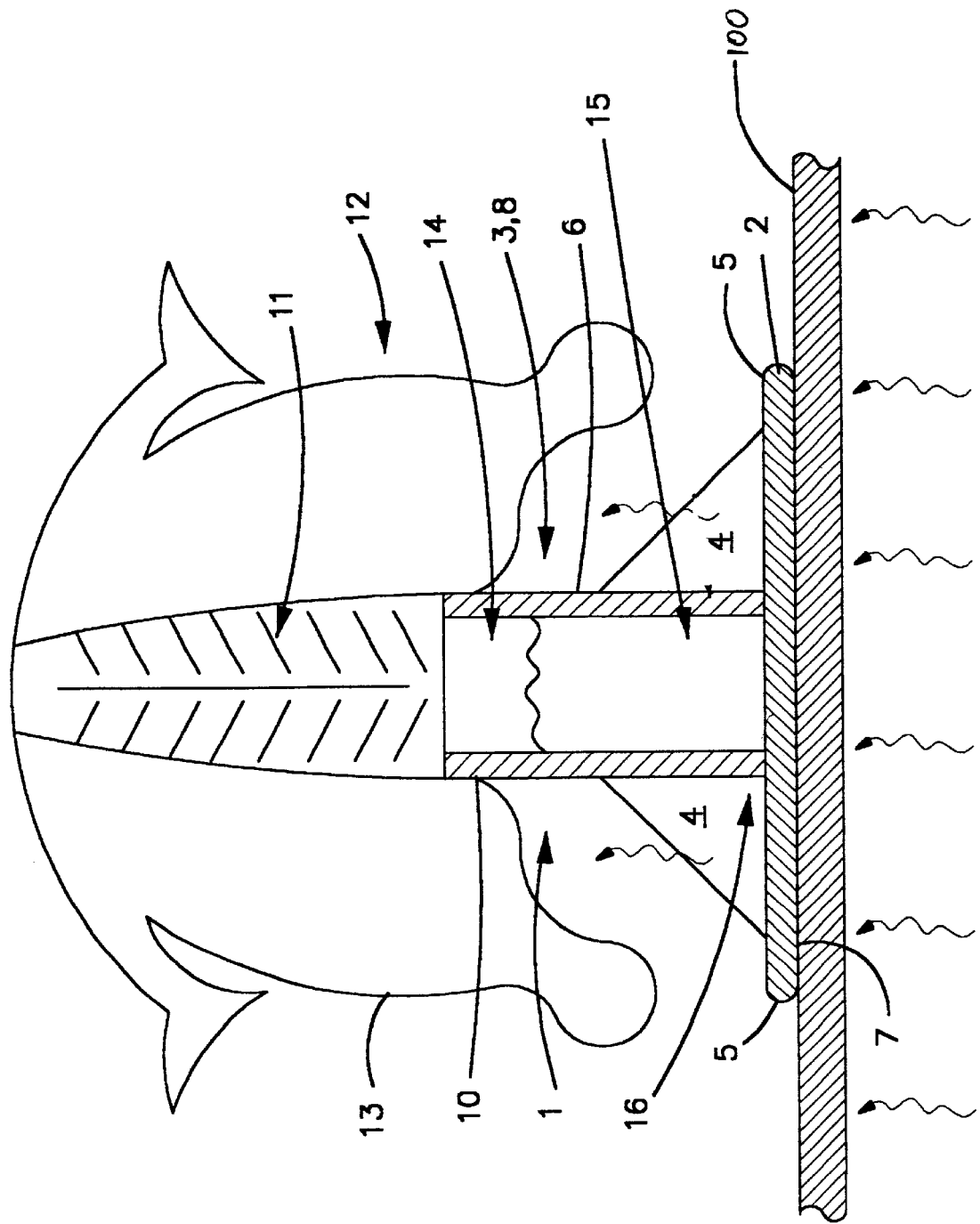
FIG. 2 illustrates a cross-sectional view of the embodiment of the invention shown in FIG. 1 employed to cook a chicken.

Referring to FIG. 2, upstanding member 3 may comprise a tubular member 8 having at least one sidewall 6 or other suitable configuration that can support a piece of food 12, such as chicken 13, in a substantially upright position. Tubular member 8 is preferably round (although other shapes may be employed) so that open first end 10 (seen in FIG. 1) may be readily positioned within the cavity 11 of chicken 13 or another piece of food 12. First end 10 is also preferably configured so that when it is positioned within the cavity 11 of a chicken 13, first end 10 forms a substantial seal with the walls of cavity 11 to prevent seasoning from escaping between upstanding member 3 and chicken 13. This seal forces the seasoning 15 into the meat, enhancing the flavor of the meat. In the embodiment seen in the Figures, first end 10 is round with an outside diameter of approximately 2.25 inches. Of course, first end 10 could take any number of shapes and sizes depending on the food being cooked.

Upstanding member 3 is preferably configured to provide a chamber 14 for food seasoning 15 so that seasoning 15 can be positioned in chamber 14 before chicken 13 is positioned over open end 10. Accordingly, upstanding member 3 has a closed second end 16 to prevent seasoning from leaking from chamber 14. Food seasoning 15 may comprise a variety of flavors and types of seasonings, but preferably comprises a liquid that will boil, allowing the vapors to pass through the walls of cavity 11 of chicken 13.

Support members 4 are suitably positioned not only to provide support between upstanding member 3 and base 2, but to also act as a stop and prevent chicken 13 from sliding completely down upstanding member 3 because it is desirable to elevate (at least to some degree) chicken 13 from the grill. In the embodiment shown in the Figures, support members 4 are triangular shaped and slope inwardly toward upstanding member 3.

A chicken 13, or other suitable piece of food, is cooked as follows. Seasoning is poured into chamber 14. First end 10 is inserted into chicken cavity 11. Apparatus 1, with chicken 13 atop upstanding member 3, is positioned within a cooking apparatus that provides a source of heat. Apparatus 1 is preferably positioned so that drippings from chicken 13 will not contact an open flame and start a grease fire within a barbecue pit. The barbecue pit is then operated to provide heat to chicken 13 until it is fully cooked. As previously discussed, it is desirable to ensure that open end 10 and cavity 11 have formed a tight fit, or substantial seal, so that seasoning will boil and enter chicken 13 through the walls of cavity 11.

The components of apparatus 1 are preferably constructed from cast iron because of its superior qualities that provide even heating, a non-stick surface upon which to cook chicken 13, and the enhanced flavor that results from using cast iron.

Although the preferred embodiment has been described, it will be appreciated by those skilled in the art to which the present invention pertains that modifications, changes, and improvements may be made without departing from the spirit of the invention defined by the claims.

I claim:

1. A cooking apparatus comprising:
   (a) a base configured to support a tubular member in a substantially upright position, said base having center point and a plurality of feet extending outward in a radial direction from said center point and forming between said feet a plurality of recesses extending inward in a radial direction toward said center point said base configured to allow air currents to flow substantially along a sidewall of said tubular member during cooking; and
   (b) said sidewalls of said tubular member defining a chamber with an open end for receiving food seasoning before a piece of food is positioned on said tubular member; and
   (c) a plurality of triangular shaped support members extending from said base and sloping inwardly and upwardly to said tubular member.

2. The apparatus according to claim 1 wherein said apparatus is constructed from cast iron.

3. The apparatus according to claim 1 wherein said piece of food has a cavity therein, said open end of said tubular member configured to be inserted into said cavity and form a substantial seal with the walls of said cavity.

4. The apparatus according to claim 1, wherein said support members are connected to said base and said tubular member.

5. A cooking apparatus comprising:
   (a) a base having a center point and supporting an upstanding member at approximately said center point, said base having at least two feet extending outward in a radial direction from said center point and a recess formed therebetween and extending inwardly in a radial direction toward said center point, thereby allowing air currents to flow substantially along said upstanding member during cooking; and
   (b) said upstanding member configured to form a chamber therein such that a food seasoning may be positioned within said chamber before a piece of food is positioned on said upstanding member.

6. The apparatus according to claim 5, further comprising a support member extending between each of said feet and said upstanding member.

7. The apparatus according to claim 5 wherein said apparatus is constructed from cast iron.

8. The apparatus according to claim 5 wherein said base comprises a plurality of feet.

9. The apparatus according to claim 5 wherein said chamber has an open end and said open end is sized to form a substantial seal when a piece of food with a cavity therein is positioned over said open end.

10. The apparatus according to claim 5, further having at least three feet and recesses formed between said feet.

11. A cooking apparatus comprising:
    (a) a base having a center point and a plurality of feet extending outward in a radial direction from said center point and forming between said feet a plurality of recesses extending inward in a radial direction toward said center point; and
    (b) a tubular member positioned over and extending upwardly from said center point, said tubular member defining a chamber with an open end for receiving food seasoning before a piece of food is positioned on said tubular member.

12. The apparatus according to claim 11, wherein said apparatus is constructed from cast iron.

13. The apparatus according to claim 11, further comprising a plurality of triangular shaped support members extending from said base and sloping inwardly and upwardly toward said tubular member.

14. The apparatus according to claim 13, wherein said support members are connected to said base and said tubular member.

* * * * *